US009834111B2

(12) United States Patent
Grewal et al.

(10) Patent No.: US 9,834,111 B2
(45) Date of Patent: Dec. 5, 2017

(54) RANGE PREDICTION IN ELECTRIC VEHICLES

(71) Applicant: Jaguar Land Rover Limited, Coventry (GB)

(72) Inventors: Karmjit Grewal, Coventry (GB); Andrew Burrows, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/897,460

(22) PCT Filed: Jun. 16, 2014

(86) PCT No.: PCT/EP2014/062573
§ 371 (c)(1),
(2) Date: Dec. 10, 2015

(87) PCT Pub. No.: WO2014/206791
PCT Pub. Date: Dec. 31, 2014

(65) Prior Publication Data
US 2016/0129803 A1    May 12, 2016

(30) Foreign Application Priority Data

Jun. 27, 2013 (GB) .................................. 1311515.9
Aug. 8, 2013 (GB) .................................. 1314234.4

(51) Int. Cl.
*B60L 11/00* (2006.01)
*B60L 11/18* (2006.01)
(Continued)

(52) U.S. Cl.
CPC .......... *B60L 11/1861* (2013.01); *B60L 11/14* (2013.01); *B60W 40/12* (2013.01); *B60W 40/13* (2013.01);
(Continued)

(58) Field of Classification Search
None
See application file for complete search history.

(56) References Cited

U.S. PATENT DOCUMENTS 6,625,539 B1     9/2003  Kittell et al.
8,860,565 B2 *  10/2014  Skaff ...................... B60K 35/00
                                                        340/425.5
(Continued)

FOREIGN PATENT DOCUMENTS

DE    10 2004 035 039 A1   7/2005
DE    10 2011 106 351 A1   6/2012
(Continued)

OTHER PUBLICATIONS

WO 2013013730A1 English translation.*
(Continued)

*Primary Examiner* — Rami Khatib
(74) *Attorney, Agent, or Firm* — Myers Bigel, P.A.

(57) ABSTRACT

A first method of predicting the range of an electric vehicle comprises, determining a range value during a current vehicle operating cycle using a first range model, wherein the first range model is dependent on an energy consumption rate value recorded during a previous vehicle operating cycle. A second method of predicting the range of an electric vehicle comprises, monitoring a trailer detecting means of the vehicle; and determining a first range value if the trailer detecting means detects that a trailer is attached to the vehicle.

13 Claims, 4 Drawing Sheets

(51) Int. Cl.
*B60L 11/14* (2006.01)
*B60W 40/12* (2012.01)
*B60W 50/00* (2006.01)
*B60W 50/14* (2012.01)
*B60W 40/13* (2012.01)

(52) U.S. Cl.
CPC ........ *B60W 50/0097* (2013.01); *B60W 50/14* (2013.01); *B60L 2200/28* (2013.01); *B60L 2240/12* (2013.01); *B60L 2240/26* (2013.01); *B60L 2240/545* (2013.01); *B60L 2240/547* (2013.01); *B60L 2240/549* (2013.01); *B60L 2250/16* (2013.01); *B60L 2260/44* (2013.01); *B60L 2260/52* (2013.01); *B60L 2260/54* (2013.01); *B60W 2510/244* (2013.01); *B60W 2520/10* (2013.01); *B60W 2530/10* (2013.01); *B60W 2530/16* (2013.01); *B60W 2530/18* (2013.01); *B60W 2550/143* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/84* (2013.01)

(56) References Cited

U.S. PATENT DOCUMENTS

| | | |
|---|---|---|
| 2010/0138142 A1 | 6/2010 | Pease |
| 2011/0166810 A1 | 7/2011 | Grider et al. |
| 2011/0301799 A1* | 12/2011 | Saito .................... B60L 11/123 701/22 |
| 2012/0035843 A1 | 2/2012 | Miura et al. |
| 2013/0096818 A1 | 4/2013 | Vicharelli et al. |
| 2013/0110331 A1* | 5/2013 | Kinser ................. B60L 11/1838 701/22 |
| 2013/0158758 A1* | 6/2013 | Kim ....................... G07C 5/004 701/22 |
| 2013/0179062 A1* | 7/2013 | Yasushi .................. G06F 17/00 701/123 |
| 2014/0129139 A1* | 5/2014 | Ellison ................ G01C 21/3469 701/533 |
| 2015/0369619 A1* | 12/2015 | Kim .................... G01C 21/3469 701/22 |
| 2016/0052397 A1* | 2/2016 | Meyer ....................... B60L 3/12 701/22 |

FOREIGN PATENT DOCUMENTS

| | | |
|---|---|---|
| WO | WO 2011/123690 A1 | 10/2011 |
| WO | WO 2012/079811 A1 | 6/2012 |
| WO | WO 2013/013730 A1 | 1/2013 |

OTHER PUBLICATIONS

Combined Search and Examination Report, GB 1314234.4, dated Jan. 29, 2014, 6 pages.
Combined Search and Examination Report, GB 1410683.5, dated Jul. 22, 2014, 4 pages.
Examination Report, GB 1410683.5, dated Nov. 18, 2015, 2 pages.
International Search Report, PCT/EP2014/062573, dated Jan. 14, 2015, 4 pages.

\* cited by examiner

RANGE PREDICTION IN ELECTRIC VEHICLES

RELATED APPLICATIONS

This application is a 35 U.S.C. §371 national stage application of PCT Application No. PCT/EP2014/062573, filed on Jun. 16, 2014, which claims priority from Great Britain Patent Application Nos. 1311515.9 filed on Jun. 27, 2013, and 1314234.4, filed on Aug. 8, 2013, the contents of which are incorporated herein by reference in their entireties. The above-referenced PCT International Application was published in the English language as International Publication No. WO 2014/206791 A2 on Dec. 31, 2014.

TECHNICAL FIELD

The invention relates to a method for predicting the range of an electric vehicle. Aspects of the invention also relate to a processing system for implementing the method and a vehicle including such a processing system.

BACKGROUND

Recent years have seen a great deal of development of Battery Electric Vehicles (BEVs) and Plug-in Hybrid Electric Vehicles (PHEVs), known collectively as electric vehicles (EVs), and the popularity of such vehicles in the market is growing steadily.

A significant factor believed to hamper the wide-spread adoption of electric vehicles is their relatively short range compared to conventional ICE-powered vehicles. To some extent, the lack of range inherent in battery-powered vehicles is mitigated by range-extending technology such as hybrid vehicles, improved battery capacity, battery reserve facilities and battery swapping stations. However, the range that is achievable by the vehicle when under electric power is still considered to be unpredictable and this has bred a fear that the vehicle has insufficient range to reach its destination, thus stranding the user at the roadside. Termed 'range anxiety', it is believed that this fear causes reluctance on the part of the user to accept electric vehicles as a serious proposition alongside conventional ICE vehicles.

Range anxiety may be alleviated if the user is provided with an accurate indicator of the available range of the vehicle. It is against this context that the invention has been devised.

SUMMARY OF THE INVENTION

In an aspect of the invention, there is provided a method of predicting the range of an electric vehicle. The method comprises determining a range value during a current vehicle operating cycle using a first range model, wherein the first range model is dependent on an energy consumption rate value recorded during a previous vehicle operating cycle.

Although the range value may be used by any vehicle sub-system, the method may include displaying a range metric to the vehicle user, the range metric being based on the determined current range value.

A benefit of the invention, therefore, is that the range value that may be displayed to the user of the vehicle is based not only on data relating to the way the vehicle is currently being driven, but also on historical data of how the vehicle has been driven during a previous vehicle operating cycle. This provides a more accurate prediction of the range of the vehicle for the user, particularly at an early point in a given vehicle operating cycle. So, the user is provided with an accurate and reliable range prediction for the vehicle very early in the operating cycle which improves usability of the vehicle as a whole.

In one embodiment, the range metric may include a distance range value being indicative of the maximum distance that the vehicle can travel until an energy store of the vehicle is depleted. Alternatively, or in addition, the range metric may include a time range value being indicative of the time for which the vehicle may remain operational until an energy store of the vehicle is depleted. The time range value may be particularly useful to display during certain predetermined vehicle states, for example when the vehicle is substantially stationary. The time range metric may be displayed instead of the distance range metric, or may also be displayed together with the distance range metric. Since an electric vehicle may have non-traction energy consumers such as air condition units, in-car entertainment systems and the like, the time range metric will provide the user with a useful indication of how long these units will continue to operate.

In one embodiment, the first range model may include calculating a composite energy consumption rate value based on i) a current energy consumption rate value associated with a current vehicle operating cycle and ii) the energy consumption rate value recorded during a previous vehicle operating cycle, and determining the range value based on the composite energy consumption rate value.

The method may include determining one or more further range values using a respective one or more further range models, wherein an average range value is determined based on the first range value and the one or more further range values.

A benefit of this approach is that since more than one range predicting model is used, the resulting calculated range value may be made more robust than relying on a single model. As an enhancement, the average range value may be calculated using a weighted average technique. A benefit of this is to reduce the influence of any individual range value in the event that it diverges significantly from a nominal average. The range prediction function is therefore made more robust against erroneous outputs from the models.

In one embodiment, the one or more further range models may include a dynamic vehicle model configured to determine a range value based on one or more of the following parameters: vehicle speed, vehicle mass, drive-train efficiency, motor efficiency, vehicle drag coefficient, rolling resistance, air density, battery state of charge, battery temperature and battery energy.

The one or more further range models may also include a state of charge model configured to determine a range value based on a measured state of charge of vehicle battery and a current energy consumption rate value.

In one embodiment, determining the first current range value may include calculating a current energy gradient value as a ratio of the distance travelled during the current vehicle operating cycle and the energy consumed during the current vehicle operating cycle and, furthermore, may include calculating the product of the energy gradient value and the instantaneous measured energy available in the energy store of the vehicle.

In this embodiment therefore, both the first range model and the state of charge model serve to predict the range of the vehicle based on different characteristics of the vehicle battery. Used together, they provide a level of redundancy to the method so as to improve the reliability of the calculated range value.

In one embodiment, the first range model may be configured to calculate the first range value based on whether a trailer is attached to the vehicle. In another aspect, therefore, the invention provides a method for predicting the range of a vehicle, the method comprising monitoring a trailer detecting means of the vehicle, and determining a first range value if the trailer detecting means detects that a trailer is attached to the vehicle.

Energy consumption of a vehicle increases significantly when it has a trailer attached. Therefore, the invention recognises that by factoring in the effects of a trailer into the calculation of the first range value, a more useful metric of vehicle range can be provided to the user.

In one embodiment, the method may include determining a second range value if the trailer detecting means detects that a trailer is not attached to the vehicle.

The first and second range values may be provided to the user as a range metric via a display screen. Therefore, the method provides the user with a range prediction function which can switch between range values depending on whether a trailer is attached. The user can therefore see immediately the expected affect that an attached trailer will have on the EV range of the vehicle.

The range metric may include a distance range value being indicative of the maximum distance that the vehicle can travel until an energy store of the vehicle is depleted. Alternatively, or in addition, the range metric may include a time range value being indicative of the time for which the vehicle may remain operational until an energy store of the vehicle is depleted. The time range value may be displayed to the user only during a predetermined vehicle state, for example when the vehicle is stationary, and, furthermore, may be displayed with or without the distance range value.

In one embodiment, the determination of the first range value is dependent on a first stored energy gradient value indicating the energy consumption rate of the vehicle during a previous vehicle operating cycle in which a trailer was attached to the vehicle, and wherein the determination of the second range value is dependent on a second stored energy gradient value indicating the energy consumption rate of the vehicle during a previous operating cycle in which a trailer was not attached to the vehicle.

Alternatively, the determination of the second range value may be dependent on a stored energy gradient value indicating the energy consumption rate of the vehicle during a previous vehicle operating cycle in which a trailer was not attached to the vehicle, and wherein the determination of the first range value may include modifying the second stored energy gradient value by a predetermined factor to represent the increased energy consumption rate of a trailer attached to the vehicle.

Although the trailer detecting means may take various forms, in one embodiment the trailer detecting means includes a sensor associated with a trailer hitch of the vehicle. Alternatively, the trailer detecting means may include monitoring the rate of change of an energy gradient value indicating the energy consumption rate of the vehicle and matching the monitored rate of change of the energy gradient value to a predetermined rate of change.

In another aspect, the invention resides in a processing system including a controller configured to implement the method as described above.

In another aspect, the invention resides in an electric vehicle including an energy store, an electric propulsion means and an on-board processing system of the previous aspect. The electric propulsion means may include an electric motor and the energy store may include a battery for supplying electrical energy to the electric propulsion means.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

A specific embodiment of the invention will now be described in which numerous specific features will be discussed in detail in order to provide a thorough understanding of the inventive concept as defined in the claims. However, it will be apparent to the skilled person that the invention may be put in to effect without the specific details and that in some instances, well-known methods, techniques and structures have not been described in detail in order not to obscure the invention unnecessarily.

Figure 1:
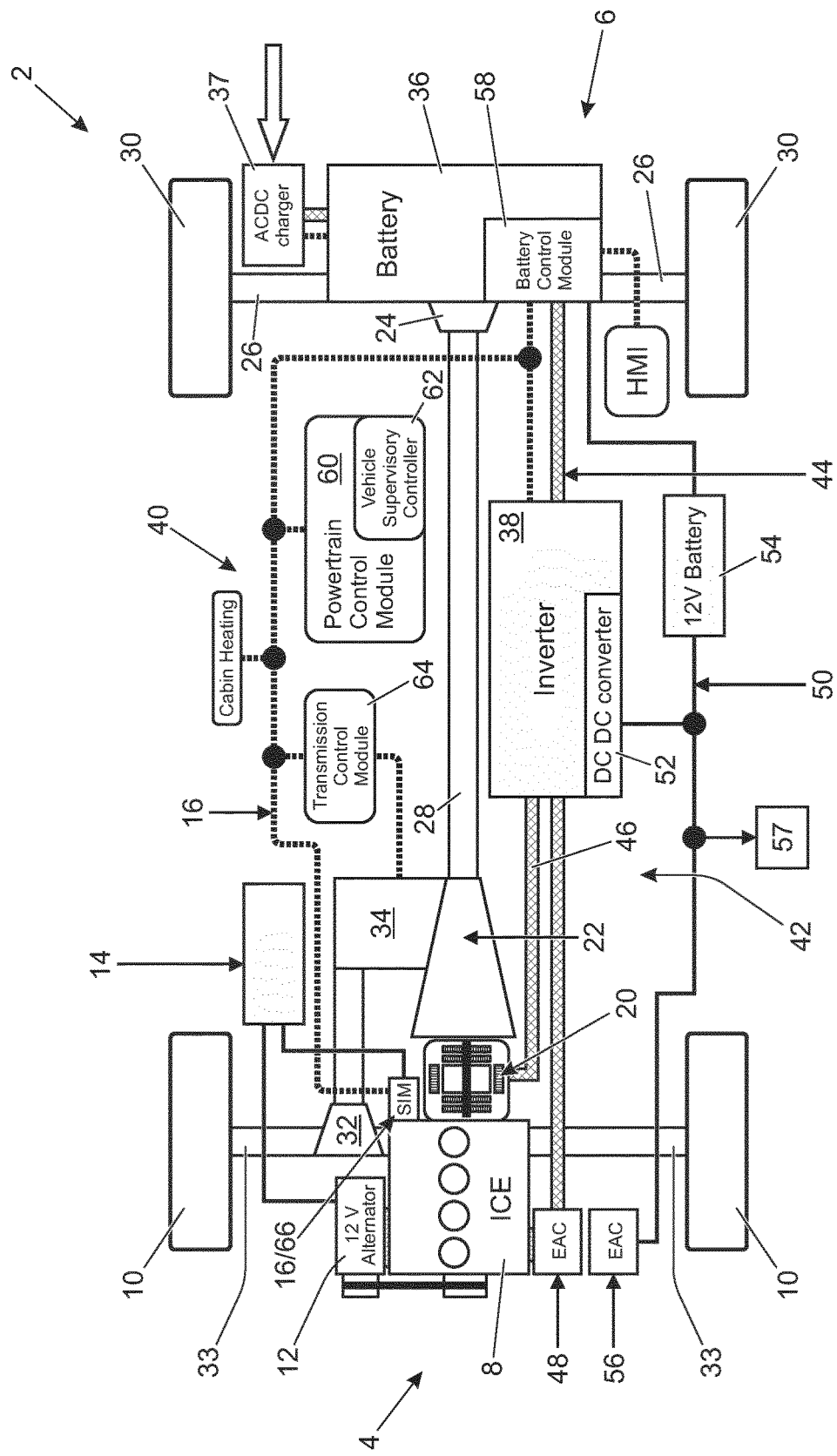
FIG. 1 is a schematic representation of a vehicle within which an embodiment of the invention may be incorporated.

An object of the invention is to provide a user of an electric vehicle with a vehicle function operable to provide an indication of the range of the vehicle that is accurate and reliable. The function may be implemented within a suitable processing system of the vehicle, as will be described. In order to place the invention in a suitable context, reference will firstly be made to an electric vehicle 2 as illustrated in FIG. 1. Here, the electric vehicle is a hybrid vehicle system 2 and includes two drive systems: an internal combustion engine system 4 and a battery-powered electric drive system 6. However, it should be noted at this point that the invention is not limited to hybrid systems.

The internal combustion engine system 4 includes an internal combustion engine 8 that may be powered by any suitable fuel source such as petrol, diesel or gaseous fuel, and it should be noted that the fuel storage and distribution system is not show in FIG. 1. Although the hybrid vehicle 2 is shown here as being in a four-wheel drive configuration such that each wheel of the vehicle is powered, the skilled person will appreciate that the invention also applies to two-wheel drive vehicles in which either the front set of wheels or rear set of wheels are driven.

Referring firstly to the internal combustion engine system 4, the engine 8 is located towards the front of the vehicle 2 between a pair of front wheels 10. In a conventional manner, the engine 8 drives a 12V alternator 12 that, in turn, is electrically coupled to a 12V battery 14. The 12V battery 14 is used exclusively for starting the engine 8 and so is coupled to a starter motor 16 for this purpose.

The engine 8 is coupled to an electrical machine in the form of a crankshaft integrated motor generator (CIMG) 20 and the CIMG 20 is, in turn, connected to a transmission 22. The precise form of the transmission 22 is not critical to the inventive concept and it may be a manual transmission, automatic transmission or continuously variable transmission, for example.

Drive from the engine 8 is directed via the transmission 22 to a rear differential 24 of a rear drive axle 26 by a primary drive shaft 28 running longitudinally along the centre of the vehicle 2. The engine 8 is therefore configured to drive a set of rear wheels 30. Since the vehicle 2 in this embodiment is all-wheel-drive, drive from the engine 8 is also transmitted to a front differential 32 of a front drive axle 33 via the transmission 22 and a transfer box 34.

Turning now to the battery-powered electric drive system 6, in overview that system comprises a high-voltage battery 36, a plug-in battery charging module 37, an inverter 38, the CIMG 20, a control network 40 and a power distribution network 42.

The high-voltage battery 36 supplies a DC supply voltage of approximately 340V to the inverter 38 via a first high voltage cable 44. From the DC supply voltage the inverter 38 generates a three-phase electrical supply voltage that is supplied to the CIMG 20 by means of a three-phase cable 46. When supplied with the three-phase electrical supply voltage, the CIMG 20 is operated as a motor. Conversely, the inverter 38 is configured to supply charge from the CIMG 20 to the high-voltage battery 36 when the CIMG 20 is operated as a generator.

In addition to its role in transferring energy between the high voltage battery 36 and the CIMG 20, the inverter 38 is also configured to supply three-phase power to an electrically driven air conditioning unit 48 and is also coupled to a low voltage bus 50 by an integral DC-DC step-down converter 52 in order to charge a second 12V battery 54. The 12V battery 54 and low voltage bus 50 supply a plurality of low voltage DC consumer units on the vehicle such as an electric power assisted steering pump 56, and a series of other units including internal lighting units (not shown), power supply sockets (not shown), and in-vehicle entertainment system (not shown), as shown collectively by an electrical load block 57.

The control network 40 is a data bus which may operate on a suitable protocol, such as the 'control area network' protocol (known as 'CAN bus' in the art), as is typical in vehicles today. The control network 40 links the control of the high voltage battery 36, via a battery control module 58, the inverter 38, vehicle control means in the form of a powertrain control module 60 that incorporates a vehicle supervisory controller 62, a transmission control module 64 and a starter motor control module 66 integral to the starter motor 16.

The vehicle 2 is configured to operate in one of three modes: a hybrid electric vehicle (HEV) mode, where both the CIMG 20 and the engine 8 may provide traction power to the front and rear wheels 10, 30; a HEV-inhibited mode in which the engine 8 alone provides traction power; and a electric vehicle (EV-only) mode in which the CIMG 20 provides the traction power.

When operating in the HEV mode the vehicle 2 operates with a hybrid powertrain, and a dual-clutch system internal to the CIMG 20 manipulates the power division or 'torque-split' between the engine 8 and the CIMG 20 to ultimately provide torque to the wheels of the vehicle. Further, when operating in this mode, the vehicle 2 is configured so that the engine 8 and the CIMG 20 may run in a parallel boost mode or a parallel charge mode.

In the HEV parallel boost mode, the CIMG 20 operates as a motor to augment the power provided by the engine 8 since both the engine 8 and the CIMG 20 supply power to the transmission 22. Therefore, the engine 8 and the CIMG 20 as sources of traction power are effectively arranged in parallel such that power can be provided by each source at a suitable power-split to drive the vehicle 2. Therefore the power, in the form of torque, applied to the input of the transmission 22 will be the combination of the torque provided by the CIMG 20 and the engine 8.

When operating in the HEV parallel charge mode, the engine 8 is arranged to propel the vehicle 2 and so the CIMG 20 acts as a generator to supply an electric charge to the inverter 38 via the three-phase cable 46. The inverter 38 in turn converts the AC power into a suitable DC voltage to charge the high-voltage battery 36.

When operating in HEV inhibited mode, only the engine 8 applies traction power to the transmission 22 and the CIMG 20 is effectively idle. This mode may become active during periods of high power demand, for example towing heavy loads or under hard acceleration.

Finally, in the EV-only mode, the CIMG 20 is configured to de-clutch the engine 8 so that the engine 8 is unable to apply torque to the transmission 22. Therefore, only the CIMG 20 drives the transmission 22. This mode may be suitable during driving conditions where there is a relatively low power demand, for example low speed driving or manoeuvring.

Selection between the HEV mode, the HEV-inhibited mode and the EV-only mode can be user-driven or it may be automatic based on prevailing driving conditions.

Arbitration between each of the modes is accomplished by the vehicle supervisory controller 62 that, in this embodiment, forms part of the power train control module 60. Whereas the power train control module 60 (sometimes also known as an 'engine control unit' or 'ECU' in the art) has a general responsibility for control of the engine 8, the vehicle supervisory controller 62 has a general responsibility for control of the electric drive system 6. Against this context, a further function of the vehicle supervisory controller 62 is to determine the residual range of the vehicle 2 when it is in EV-only mode. To this end the vehicle supervisory controller 62 serves as a processing system to implement a range prediction function 70 as will now be described with reference to the functional block diagram of FIG. 2.

The objective of the range prediction function 70 is to provide an accurate prediction of the range of the electric vehicle which is dependent on the driving style, drive cycle, vehicle speed and energy overheads from consumer units on the vehicle, and to inform the driver of the EV range available based on the remaining energy in the high voltage battery 36.

In a broad sense the range prediction function 70 includes three separate range models comprising a dynamic vehicle model 72, an energy model 74 and a state of charge model 76 (or 'SoC model'). Each of the three models receives one or more inputs of vehicle-related data, as will be described, and calculates a predicted range of the vehicle as an output. The range outputs from each of the models 72, 74, 76 are fed into an aggregator function 78 which outputs a single range value to a display interface 80 within the vehicle cabin. In this embodiment, the display interface 80 may be a display screen that is integrated with the multimedia system of the vehicle and may be controlled via touch-sensitive functionality, for example. However, the display interface 80 may instead be a standalone display equipped to display a simple alphanumeric output to the user.

A more detailed explanation of the aggregator function 78 will be given later but, at a high level, the aggregator function 78 implements a data fusion technique in the form of a weighted average voting scheme which provides reliability, availability and robustness to the range calculation. The aggregator function 78 acts to filter erroneous outputs from any one of the models 72,74,76 in favour of the range values received from the other models, thereby ensuring accuracy and robustness of the EV range value that is provided for the user.

The description will now focus on the functionality of the dynamic vehicle model 72, an energy model 74 and a state of charge model 76, as mentioned above.

Dynamic Vehicle Model

The objective of the dynamic vehicle model 72 is to calculate a predicted range value based on physical parameters associated with the vehicle. To this end, the dynamic vehicle model 72 receives a plurality of inputs relating to dynamic and static parameters of the vehicle. In this embodiment, the dynamic vehicle model 72 receives a vehicle speed parameter 82 and a power parameter 84 that represents the power delivered to the front and rear wheels of the vehicle, as appropriate. The vehicle speed parameter 82 is received directly from the speedometer system of the vehicle and is available as a message on the control network 40. However, the power parameter 84 is based on a plurality of input parameters including the vehicle speed parameter 82, an aerodynamic drag value 86, a nominal vehicle mass value 88, a rolling resistance value 90 and a system efficiency value 92. Note that these values are static variables that may be stored in an appropriate non-volatile memory module associated with the range prediction function 70 within the vehicle supervisory controller 62.

The dynamic vehicle model 72 also receives parameters relating to the electric drive system 6 of the vehicle 2, which are made available by the battery control module 58. In this embodiment the parameters include i) an external load parameter 94 which is a measure of the combined power drawn by the electrical consumer units 57 of the vehicle, and which therefore factors in to the model 72 an electrical overhead on the high voltage battery 36, and ii) a battery energy parameter 96 which provides an indication of the residual charge capacity of the high voltage battery 36.

The battery energy parameter 96 is determined by and output from the battery control module 58 based on inputs including a battery temperature parameter 98, a state of health (SoH) parameter 100, which is expressed as a percentage value as is typical in the art, and a state of charge (SoC) parameter 102 (also known as Depth of Discharge in the art) which is also expressed as a percentage value as is typical in the art.

The dynamic vehicle model 72 uses the values and measured parameters discussed above to determine a predicted range value based on the following equation:

$$\text{Range} = \frac{\text{Battery energy(kWh)}}{(\text{power at wheels(kW)}/\text{system efficiency(battery to wheels)}) + \text{external loads(kW)}} \times \text{vehicle speed} \quad [1]$$

The dynamic vehicle model 72 thereby determines a predicted range value and outputs this as a first input to the aggregator function 78, as discussed above.

Having explained the components of the dynamic vehicle model 72, discussion will now turn to the energy model 74.

Energy Model

In overview, the objective of the energy model 74 is to provide a second predicted range value as an output based on various input values and measured parameters that relate particularly to the electric drive system 6 of the vehicle 2. The energy model receives inputs from the battery control module 58, a distance travelled parameter 103 and stored energy gradient values, as will be explained. The energy model 74 then outputs a predicted range value to the aggregator function 78 for combination with the inputs from the other vehicle models 72,76.

In more detail, the energy model includes first and second sub-models: a 'standard' energy model 74a and a 'trailer attached' energy model 74b. The two sub-models 74a, 74b will now be explained further, in turn.

As mentioned, the standard energy model 74 includes an input from the battery control module 58 to indicate the energy available in the high voltage battery 36. The standard energy model 74a requires an indication of the charge that the CIMG 20 has consumed since the start of the current vehicle cycle, and so the input from the battery control module 58 is passed through a difference calculator 104 in order to determine the difference between an 'initial' energy value 105 as determined at the start of the current vehicle running cycle and a 'current' or 'final' energy value 106 which represents a temporal snapshot of the energy level of the battery 36. The output from the difference calculator 104, or 'delta energy' value 107 is then fed into the standard energy model 74a, together with the distance travelled value 103.

The standard energy model 74a carries out a set of calculations in order to determine a predicted range value. In one embodiment, the set of calculations are as follows:

Firstly, the standard energy model 74a calculates an energy gradient value using the equation expressed below:

$$\text{Energy gradient}\left(\frac{\text{Distance}}{\text{kWh}}\right) = \frac{EV \text{ distance travelled}}{\text{Initial energy} - \text{final energy}} \quad [2]$$

The energy gradient value therefore provides a metric of the current energy consumption of the vehicle in units of distance per kWh (kilowatt hour).

Following calculation of the energy gradient, the standard energy model 74a calculates a range value using the equation expressed below:

Range=Energy gradient (distance/kWh)×Final energy (kWh)     [3]

Equation 3 therefore provides a predicted range value of the vehicle 2 when in EV-only mode based on the current rate of energy consumption. However, in order to improve the accuracy of the range prediction function 70, the standard energy model 74a may also implement a 'range initialisation strategy' that takes into account historical range data of the vehicle during previous running cycles.

In one embodiment, as a first step the standard energy model 74a implements the equation below in order to calculate an 'initialised' energy gradient value:

Initialised energy gradient=stored energy gradient+ [filter×(current energy gradient−stored energy gradient)]     [4]

It should be noted that in equation [4] above, the value 'stored energy gradient' is the energy gradient stored at storage function 108 at the end of the immediately preceding vehicle running cycle, referred to as 'key off' 109. The stored energy gradient value is then available to be read from memory at functional block labelled as 110 at the start of the current running cycle, or at 'key on' 111.

Following the above approach, the range initialisation strategy can be considered to be a learning function since it makes use of historical stored energy gradient data to calculate an initialised energy gradient value. The initialised energy gradient value can therefore be considered to be a 'composite value' providing a value of the energy consumption rate that takes into account of current and historical data.

In equation [4], a filter is applied to the difference between the current energy gradient and the stored energy gradient to counteract spiking in output. It should be noted at this point that it is the initialised energy gradient that is stored at the termination of the current running cycle at storage function 108, as has been mentioned above.

Figure 3:
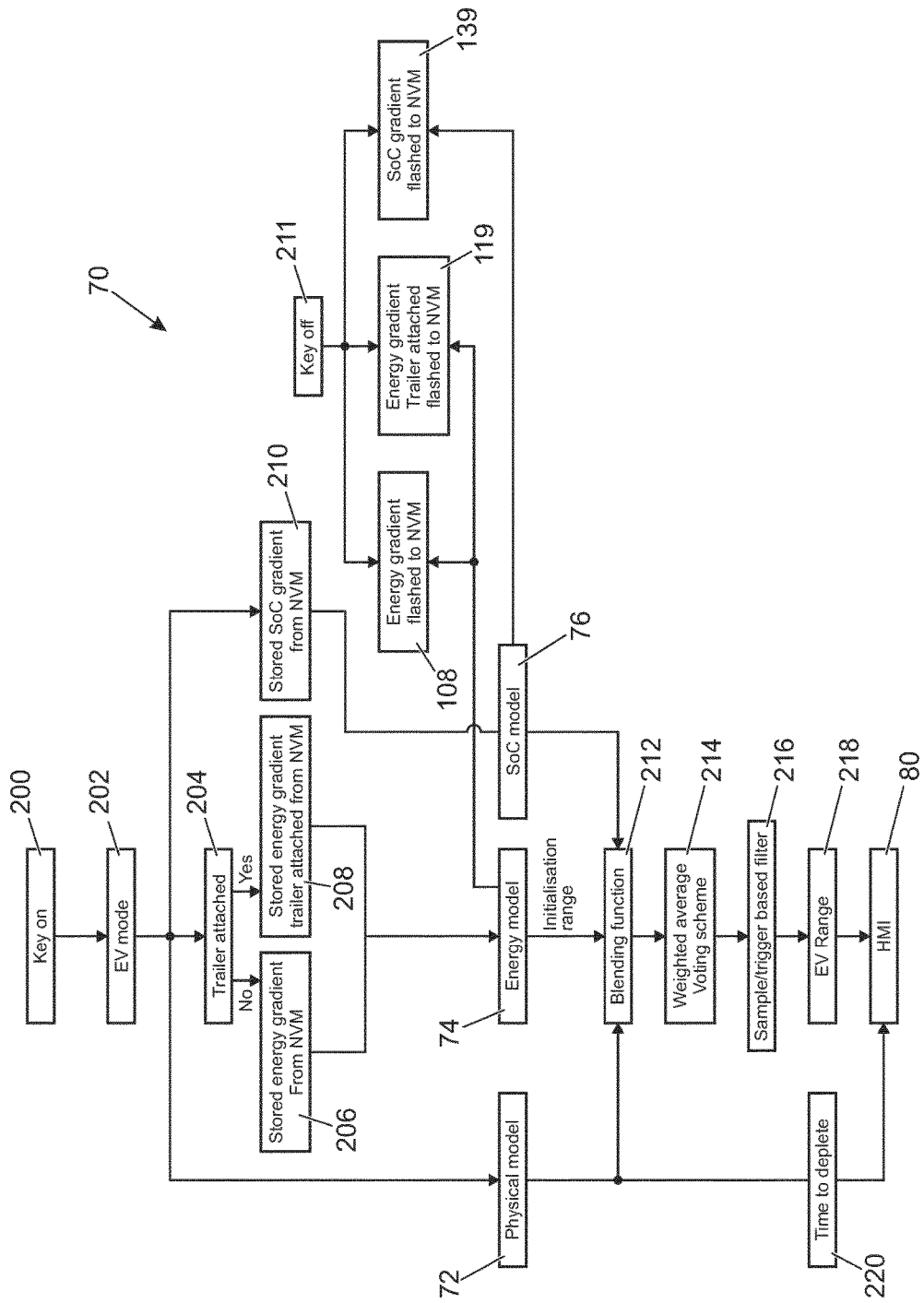
FIG. 3 a functional flow chart of an embodiment of the invention.
Figure 4:
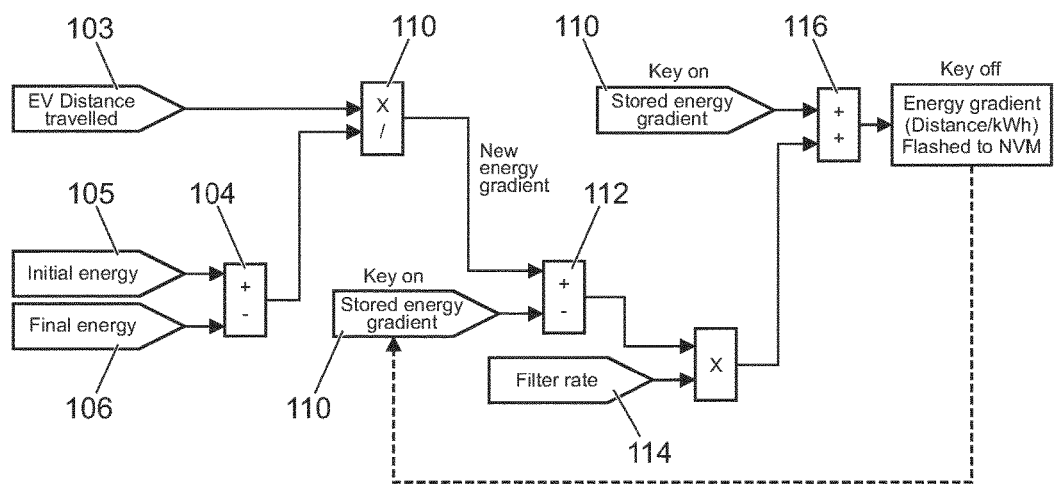
FIG. 4 is a flow chart illustrating an algorithm for determining an initialised range.

The above process for calculating the initialised energy gradient value is also expressed in FIG. 4, in which common steps are provided with the same reference numerals. Accordingly, the final energy value 106 is subtracted from the initial energy value 105 at difference calculator 104. The output of the difference calculator 104 is input into dividing function 110 together with the distance travelled value 103. The quotient of the dividing function 110 is the current energy gradient value. It will be noted, therefore, that the process in FIG. 3 up to this point implements equation [2], above.

The following process of FIG. 4 implements equation [4], above. The current energy gradient value is input into difference function 112 together with the stored energy gradient value 110. The difference function 112 subtracts the stored energy gradient value 110 from the current energy gradient value and the output is multiplied through a filter rate 114. The filtered output from difference function 112 is then input to summing junction 116 together with the stored energy gradient value 110 resulting in the initialised energy gradient value as calculated in equation [4], which is thereby stored internally at functional block 108.

Having described the functionality of the standard energy model 74a, the focus will now turn to the trailer attached energy model 74b. The trailer attached energy model 74b has a function which is substantially the same as the standard energy model 74a in that it implements equations [2], [3] and [4] in the process of FIG. 4 in order to calculate an initialised energy gradient value and, therefore, a predicted range value of the vehicle based on characteristics of the electric drive system 6.

The predicted range value calculated by the standard energy model 74a is responsive to the way in which the vehicle is being driven due to the use of the calculated energy gradient value and the model 74a also takes into account the energy gradient value stored at the end of a previous driving cycle. However, due to the various filters in the system, any change to the calculated energy gradient value will cause only a gradual change to the calculation of the predicted range value. For example, if the energy consumption of the vehicle were to undergo a significant step change, which may occur when a trailer is attached to the vehicle, the predicted range value would adapt relatively slowly which may provide an inaccurate range value to the drive of the vehicle.

To address this, the trailer attached energy model 74b replicates the range calculation processes described above with reference to the standard energy model 74a but is configured specifically to respond rapidly if the vehicle is hitched to a trailer. Since the processes have been described above, they will not be described again here.

The trailer attached energy model 74b runs in parallel to the standard energy model 74a and receives the same stored values and measured parameters as inputs, namely a distance travelled parameter 103 and a delta energy value 107. However, the trailer attached energy model 74b also receives a trailer attached energy gradient value 118 which is stored in a suitable energy model of the vehicle supervisory controller 62.

In calculating a predicted range value, the trailer attached energy model 74b implements a modified version of equation [4], in which the trailer attached energy gradient value 118 retrieved from memory is substituted for the stored energy gradient value in equation [4].

In this case, the stored trailer attached energy gradient value 118 represents the energy gradient that is stored at key off 109 by the trailer attached energy model 74b during a previous vehicle running cycle in which a trailer was attached to the vehicle, as represented at storage function 119.

Since the standard energy model 74a and the trailer attached energy model 74b run alongside one another, the range prediction function 70 is provided with means to prioritise the output of one model against the other. To this end, the predicted range values that are output by both the standard energy model 74a and the trailer attached energy model 74b are input into a switch module 120. The switch module 120 is responsive to a trailer attached signal 122 that is made available on the control network 40 from a body control module of the vehicle (not shown). The trailer attached signal 122 may be generated by various means, for example by means of the electrical hook-up, if available, a mechanical switch incorporated into the trailer hitch of the vehicle, or even an optical or magnetic pick-up on the hitch to detect the presence of a trailer.

The switch module 120 determines which output from either the standard energy module 74a or the trailer attached energy model 74b is sent to the aggregator function 78. Thus, if the trailer attached signal 122 is negative the switch module 120 transfers the predicted range value from the standard vehicle model 74a to be input into the aggregator function 78. Conversely, if the trailer attached signal 122 is positive, then the switch module 120 transfers the calculated range value from the trailer attached energy model 74b to be transferred to the aggregator function 78.

Advantageously, if a trailer was attached to the hitch of the vehicle part way through a vehicle operating cycle, this would be detected by the switch module 120 by way of the trailer attached signal 122 and the EV-range value displayed to the user at display interface 80 would be updated promptly thereby providing the user with a more accurate indication of the available EV-range of the vehicle.

Although the selection of the outputs of the standard energy model 74a and the trailer attached energy model 74b is shown as being achieved by the switch module 120, it is envisaged that this could be achieved in other ways.

For example, in one alternative embodiment, during vehicle operation with no trailer attached the standard energy model 74a may operate by default whilst the trailer attached energy model 74b remains inactive. Then, in the event a trailer is attached to the vehicle, suitable switching means may be provided to deactivate the standard energy model 74*a* and to activate the trailer attached energy model 74*b*.

In a further embodiment, means may be provided to activate the trailer attached energy model 74*b* in the event that the trailer attached signal 122 is not available. For example it is envisaged that means may be provided to monitor the rate of change of the energy gradient value whilst filtering out the effects of driving style and driving conditions on the energy gradient value. If a predetermined rate of change of the energy gradient is identified, the trailer attached energy model 74*b* may be activated in order to maintain accuracy of the EV-range value output at the display interface 80.

State of Charge Model

Turning now to the state of charge model 76, this model advantageously provides a further range prediction capability based on characteristics of the high voltage battery 36 in addition to the output of the energy model 74. This builds in a level of redundancy into the range prediction function 70 since, if the output from the energy model 74 becomes unreliable, the aggregator function 78 still receives an accurate calculated range value from the state of charge model 76.

In more detail, the state of charge model 76 receives as inputs the state of charge parameter 102 from the battery control module 58, the distance travelled parameter 103 and a stored state of charge (SoC) gradient value 130, as stored in memory by the state of charge model 76 during a previous running cycle.

Based on these inputs, the state of charge model 76 implements a set of calculations to determine a predicted range value (or 'SoC range value') 132. Firstly, the state of charge model determines a 'state of charge gradient' which is a ratio of the distance travelled during the current running cycle and the state of charge, as expressed as a percentage between 0% and 100%, thereby representing the distance that the vehicle is able to travel in EV-only mode for a 1% reduction in the state of charge of the high voltage battery 36. The state of charge gradient value may be calculated using the equation below:

$$SoC \text{ gradient value} = \frac{EV \text{ distance travelled}}{\text{Initial } SoC - \text{current } SoC} \quad [6]$$

Following the determination of the current state of charge gradient value, the model 76 then calculates a predicted range value using the following equation:

$$SoC \text{ Range} = SoC \text{ gradient value} \times \text{current } SoC \quad [7]$$

The state of charge model 76 thereby outputs the calculated SoC range value 132 as an input to the aggregator function 78 and also provides the calculated SoC gradient value 130 to a storing function 134 which stores the SoC gradient value 130 in a suitable memory store at the end of the vehicle running cycle, as mentioned above.

Although not described here, it should be appreciated that the state of charge energy model 76 may also be modified to include a 'trailer attached' functionality as described above with respect to the energy model 74, although this added functionality would be at the expense of a high processor loading. However, it is currently envisaged that the state of charge model 76 will, in essence, provide a back-up range prediction function to the energy model 74 and so in this embodiment the state of charge model 76 has not been described with such functionality.

Fusion of Model Data

The above sections of the description discuss the processes by which the dynamic vehicle model 72, the energy model 74 and the state of charge model 76 calculate respective predicted range values and input these values into the aggregator function 78. The role of the aggregator function 78 is to arbitrate between the different inputs to provide a single predicted EV-range value to the display interface 80.

Figure 5:
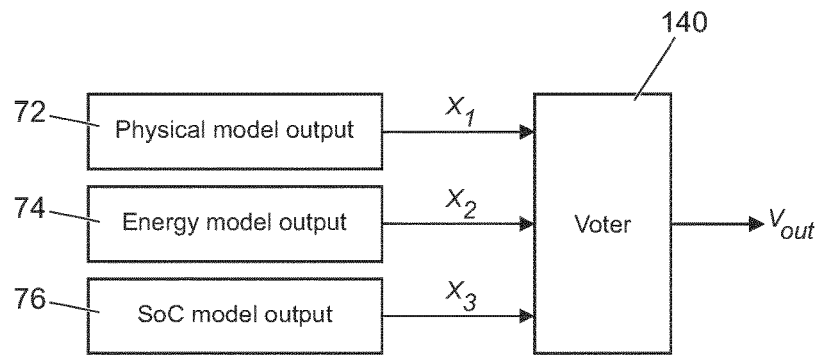
FIG. 5 is a block diagram depicting a data fusion strategy.

In this embodiment, the aggregator function 78 implements a weighted average voting scheme which provides a robust predicted range output even if any of the model outputs become unreliable. FIG. 5 illustrates an embodiment of the voting scheme, in which outputs of the dynamic vehicle model 72 (shown here as "physical model"), the energy model 74 and the state of charge model 76 are shown as variables '$X_1$', '$X_2$' and '$X_3$', respectively, and which are input into a voting module 140. In turn, the voting module 140 outputs an EV-range value, shown in FIG. 5 as $V_{out}$.

The voting module 140 implements the following equation in order to determine $V_{out}$ from the input variables $X_1$, $X_2$ and $X_3$.

$$V_{Out} = \frac{w_1 x_1 + w_2 x_2 + w_3 x_3}{w_1 + w_2 + w_3} \quad [8]$$

Where:

$$w_1 = \left[1 + \left(\frac{x_1 - x_2}{a}\right)^2 \left(\frac{x_1 - x_3}{a}\right)^2\right]^{-1}$$

$$w_2 = \left[1 + \left(\frac{x_2 - x_1}{a}\right)^2 \left(\frac{x_2 - x_3}{a}\right)^2\right]^{-1}$$

$$w_3 = \left[1 + \left(\frac{x_3 - x_1}{a}\right)^2 \left(\frac{x_3 - x_2}{a}\right)^2\right]^{-1}$$

Note that in the above expressions the variable 'a' is a tolerance parameter (represented by a percentage) that is tuned to the required amount of noise allowable within the weighted average voting scheme. It is envisaged that a suitable value for the tolerance parameter 'a' may be '10', although this is not to be considered limiting. The value of the tolerance parameter affects the weighting attributed to the variables $X_1$, $X_2$ and $X_3$ in dependence on the variance of individual variables relative to the average.

For example, a relatively low tolerance value, for example below 10, and more particularly below 5, would cause the weights calculated for the variables $X_1$, $X_2$ and $X_3$ to be highly responsive to deviations in the individual variables away from an average value. Therefore, if one of the variables $X_1$, $X_2$ and $X_3$ were to deviate away sharply from the average, this particular variable would quickly be assigned a lower weight so that it would be less dominant in the calculation of the vehicle EV-range output $V_{out}$.

Functional Process

An embodiment of the range prediction function 70 of the invention is also expressed in the functional flowchart of FIG. 3.

The process starts at 'key-on' of the vehicle, at step 200, in which the vehicle is powered up and its systems are initialised. It will be noted that the key-on step 200 represents the activation of the vehicle and so need not require a physical step of inserting a key of the vehicle into a key-receiver of an ignition system. For example, the key could be a remote module able to communicate with the vehicle via a short-range radio transponder, as is typical in remote keyless entry systems. In this case, the vehicle may include a remote keyless ignition system which may be configured to activate the vehicle simply by the remote module being inside or at least within a certain proximity of the vehicle. Alternatively, the vehicle may require a further step to activate the vehicle such as the user pressing a 'start' button for example.

Following 'key-on' of the vehicle at step 200, the vehicle is entered into the EV-only mode at step 202. Once the EV-only mode is selected, the process divides in order to activate each of the dynamic vehicle model 72, the energy model 74 and the state of charge model 76.

Prior to activating the energy model 74, however, the process checks the trailer attached signal at step 204 and, in response, loads either of i) a stored energy gradient value 110 or ii) a trailer attached energy gradient value 118 into the energy model 74, as represented by steps 206 and 208. As described above with reference to FIG. 2, the energy model 74 will output a suitable predicted range value depending on whether or not a trailer is detected as attached to the tow hitch of the vehicle.

At this stage, the process also loads a SoC gradient value 130 into the state of charge model, as represented at step 210.

At this point, therefore, once the energy model 74 and the state of charge model 76 have been initialised, the dynamic vehicle model 72, the energy model 74 and the state of charge model 76 are running substantially in parallel within the vehicle supervisory controller 62 and are outputting respective predicted range values.

Figure 2:
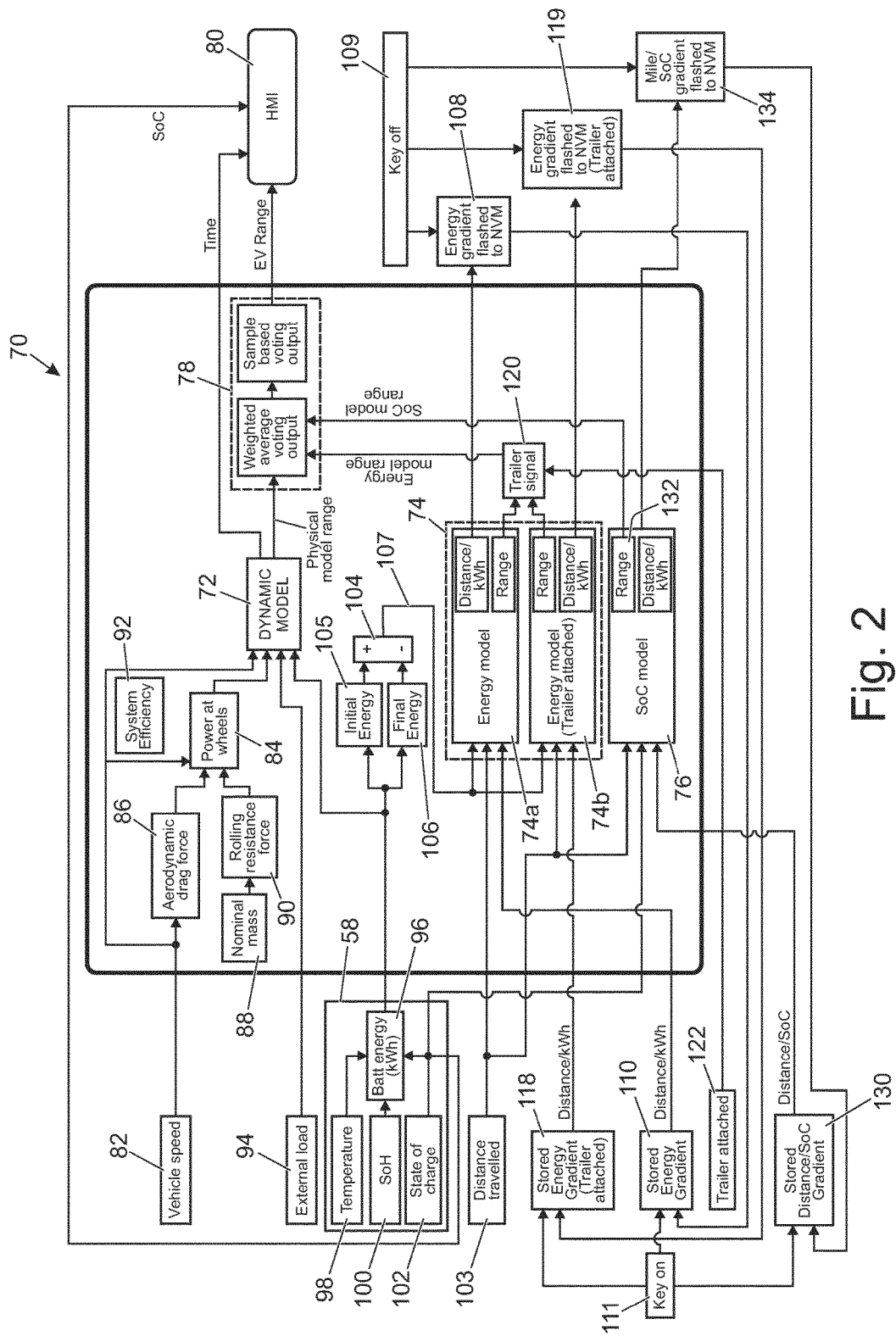
FIG. 2 is a functional block diagram of an embodiment of the invention.

The energy model 74 and the state of charge model 76 are also operable to store respective gradient values at the end of the current running cycle, at 'key off' 211, as represented by storage functions 108, 119 and 134, respectively, in common with FIG. 2

The outputs from the dynamic vehicle model 72, the energy model 74 and the state of charge model 76 are integrated through a blending function 212 from the initialised predicted range value output from the energy model 74 to the current predicted range. This takes place within a specified distance, for example within the first 1 km of driving.

Following the blending function 212, the three predicted range values output from the respective models 72,74,76 are processed through a weighted averaging function 214, as explained above with reference to the aggregator function 78, the result of which is a single predicted range output $V_{out}$, as described above.

The output value $V_{out}$ from the weighted average function 214 is then sampled at step 216 by a suitable trigger sampling technique and filtered to provide a final predicted EV-range value 218 to the display interface 80. Any suitable sampling frequency may be used, but it is currently envisaged that a sampling frequency of 1 kHz is suitable and provides a balance between signal reproduction and processor load.

In addition to the final predicted EV-range value 218 that is displayed on the display interface 80, the predicted range value that is output from the dynamic vehicle model 72 is also input to a conversion function 220 that converts the range value to a 'time to deplete' value, such a value giving a measure of the time for which the vehicle will remain operational until the high voltage battery 36 is charge-depleted. Since such a measurement is only of interest to the user when the vehicle is stationary, the conversion function 218 may be operable to provide an output to the display interface 80 when the vehicle is stationary, for example when the vehicle is in a 'park' mode. To avoid the display flicking between the time to deplete value and the distance range value, it is envisaged that the vehicle will need to be stationary for a predetermined length of time, for example between 1 and 3 minutes, before displaying the time to deplete mode. Note, however, that this is not essential.

Optionally, the conversion function 218 may continuously provide the time to deplete value, but the display interface 80 may be responsible for determining the appropriate conditions during which to display the time to deplete value to the user.

A benefit of this is that the user is still provided with a metric that indicates the operational 'range' of the vehicle, albeit a temporal range instead of a distance range. When the vehicle is stationary, although the CIMG 20 is not consuming power, there may still be a significant power draw on the high voltage battery 36, for example due to the DC consumer units of the vehicle, air conditioning system, in-car entertainment system and the like. A time to deplete metric is a useful value for the user so they can determine the remaining useful running time for the vehicle even when stationary.

In this embodiment, it is envisaged that the display of the time to deplete value will be an alternative to the EV-range value. However, it is also acceptable to indicate these two values simultaneously.

This description has discussed various embodiments of the range prediction function 70. However, the skilled person would understand that the embodiments disclosed are merely examples of the way in which certain aspects of the invention can be implemented and do not represent an exhaustive description of all the ways in which the invention can be embodied and that many variations may be made to the above examples without departing from the scope of the invention as defined in the accompanying claims.

For example, in the above description the engine 8 has been referred to in general terms. However, the skilled person would understand that the engine 8 may be any combustion engine including a spark-ignition engine fuelled by gasoline or natural gas for example, a compression-ignition engine fuelled by diesel, or even a steam or gas-turbine engine. Therefore, the invention should not be limited to a particular type of engine. Similarly, although the hybrid vehicle 2 has been described as having a battery, it should be noted that other electrical energy storage means are acceptable, such as supercapacitors.

The vehicle of the specific embodiments described above is a plug-in hybrid electric automotive vehicle (PHEV). However, the invention is applicable to other types of electric-based automobiles such as battery electric vehicles (BEVs) and hybrid electric vehicles (HEVs) without a plug-in facility. Similarly, the invention is not to be limited to the automotive field since it could also be applied to any vehicle equipped with an electric storage means (battery or capacitor system) for propulsion, such as bicycles, street trams and locomotives, for example. Similarly, although an electric motor is a common means of electric propulsion, the invention encompasses other means, for example a electromagnetic propulsion coils used in magnetic levitation train systems.

Aspects of the invention will now be expressed in the following numbered paragraphs:

1. A method of predicting the range of an electric vehicle, comprising determining a range value during a current vehicle operating cycle using a first range model, wherein the first range model is dependent on an energy consumption rate value recorded during a previous vehicle operating cycle.

2. The method of paragraph 1, including displaying a range metric to the vehicle user, the range metric being based on the determined current range value.

3. The method of paragraph 2, wherein the range metric includes a distance range value being indicative of the maximum distance that the vehicle can travel until an energy store of the vehicle is depleted.

4. The method of paragraph 2, wherein the range metric includes a time range value being indicative of the time for which the vehicle may remain operational until an energy store of the vehicle is depleted.

5. The method of paragraph 4, wherein the time range value is displayed to the user during a predetermined vehicle state.

6. The method of paragraph 5, wherein the predetermined vehicle state includes the vehicle being substantially stationary.

7. The method of paragraph 1, wherein the first range model includes calculating a composite energy consumption rate value based on i) a current energy consumption rate value associated with a current vehicle operating cycle and ii) the energy consumption rate value recorded during a previous vehicle operating cycle, and determining the range value based on the composite energy consumption rate value.

8. The method of paragraph 1, including determining one or more further range values using a respective one or more further range models, wherein an average range value is determined based on the first range value and the one or more further range values.

9. The method of paragraph 8, wherein the average range value is determined using a weighted average technique.

10. The method of paragraph 8, wherein the one or more further range models includes a dynamic vehicle model configured to determine a range value based on one or more of the following parameters: vehicle speed, vehicle mass, drive-train efficiency, motor efficiency, vehicle drag coefficient, rolling resistance, air density, battery state of charge, battery temperature and battery energy.

11. The method of paragraph 8, wherein the one or more further range models includes a state of charge model configured to determine a range value based on a measured state of charge of vehicle battery and a current energy consumption rate value.

12. The method of paragraph 1, wherein determining the first current range value includes calculating a current energy gradient value as a ratio of the distance travelled during the current vehicle operating cycle and the energy consumed during the current vehicle operating cycle.

13. The method of paragraph 12, wherein determining the first current range value includes calculating the product of the energy gradient value and the instantaneous measured energy available in the energy store of the vehicle.

14. The method of paragraph 1, wherein the first range model is configured to calculate the first range value based on whether a trailer is attached to the vehicle.

15. A method for predicting the range of a vehicle, the method comprising:
monitoring a trailer detector of the vehicle; and
determining a first range value if the trailer detector detects that a trailer is attached to the vehicle.

16. The method of paragraph 15, including determining a second range value if the trailer detector detects that a trailer is not attached to the vehicle.

17. The method of paragraph 15, including displaying a range metric to the user, wherein the range metric is based on the first range value.

18. The method of paragraph 16, including displaying a range metric to the user, wherein the range metric is based on the first range value or the second range value.

19. The method of paragraph 17, wherein the range metric includes a distance range value being indicative of the maximum distance that the vehicle can travel until an energy store of the vehicle is depleted.

20. The method of paragraph 17, wherein the range metric includes a time range value being indicative of the time for which the vehicle may remain operational until an energy store of the vehicle is depleted.

21. The method of paragraph 20, wherein the time range value is displayed to the user during a predetermined vehicle state.

22. The method of paragraph 21, wherein the predetermined vehicle state includes the vehicle being substantially stationary.

23. The method of paragraph 16, wherein the determination of the first range value is dependent on a first stored energy gradient value indicating the energy consumption rate of the vehicle during a previous vehicle operating cycle in which a trailer was attached to the vehicle, and wherein the determination of the second range value is dependent on a second stored energy gradient value indicating the energy consumption rate of the vehicle during a previous operating cycle in which a trailer was not attached to the vehicle.

24. The method of paragraph 16, wherein the determination of the second range value is dependent on a stored energy gradient value indicating the energy consumption rate of the vehicle during a previous vehicle operating cycle in which a trailer was not attached to the vehicle, and wherein the determination of the first range value includes modifying the second stored energy gradient value by a predetermined factor to represent the increased energy consumption rate of a trailer attached to the vehicle.

25. The method of paragraph 15, wherein the trailer detecting means includes a sensor associated with a trailer hitch of the vehicle.

26. The method of paragraph 15, wherein the trailer detecting means includes monitoring the rate of change of an energy gradient value indicating the energy consumption rate of the vehicle.

27. The method of paragraph 26, including matching the monitored rate of change of the energy gradient value to a predetermined rate of change.

28. A processing system for an electric vehicle having a controller configured to implement the method paragraph 1.

29. An electric vehicle including an energy store, an electric propulsion system and an on-board processing system having a controller in accordance with paragraph 28.

30. The electric vehicle of paragraph 29, wherein the electric propulsion system includes an electric motor.

31. The electric vehicle of paragraph 29, wherein the energy store includes a vehicle battery for supplying electrical energy to the electric propulsion system.

The invention claimed is:

1. A method of predicting a range of an electric vehicle, the method comprising the following performed by a controller of the vehicle:
determining a range value during a current vehicle operating cycle using a first range model, wherein the first range model is dependent on an energy consumption rate value recorded during a previous vehicle operating cycle;
determining one or more further range values using a respective one or more further range models;

determining an average range value based on the range value during the current vehicle operating cycle and the one or more further range values; and displaying a range metric to a vehicle user via a display screen within the vehicle, the range metric based on the range value during the current vehicle operating cycle and the one or more further range values.

2. The method of claim 1, wherein the range metric includes a distance range value being indicative of a maximum distance that the vehicle can travel until an energy store of the vehicle is depleted.

3. The method of claim 1, wherein the range metric includes a time range value being indicative of a time for which the vehicle may remain operational until an energy store of the vehicle is depleted.

4. The method of claim 3, wherein the time range value is displayed to the vehicle user via the display screen, during a predetermined vehicle state.

5. The method of claim 1, wherein the first range model includes calculating a composite energy consumption rate value based on i) a current energy consumption rate value associated with the current vehicle operating cycle and ii) the energy consumption rate value recorded, during the previous vehicle operating cycle, and determining the range value based on the composite energy consumption rate value.

6. The method of claim 1, wherein the average range value is determined using a weighted average technique.

7. The method of claim 1, wherein the one or more, further range models includes a dynamic vehicle model configured to determine a range value based on one or more of the following parameters: vehicle speed, vehicle mass, drive-train efficiency, motor efficiency, vehicle drag coefficient, rolling resistance, air density, battery state of charge, battery temperature and battery energy.

8. The method of claim 1, wherein the one or more further range models includes a state of charge model configured to determine a range value based on a measured state of charge of a vehicle battery and a current energy consumption rate value.

9. The method of claim 1, wherein determining the range value during the current vehicle operating cycle includes calculating a current energy gradient value as a ratio of a distance travelled during the current vehicle operating cycle and energy consumed during the current vehicle operating cycle.

10. The method of claim 9, wherein determining the range value during the current vehicle operating cycle includes calculating a product of the current energy gradient value and an instantaneous measured energy available in an energy store of the vehicle.

11. The method of claim 1, wherein the first range model is configured to calculate the range value during the current vehicle operating cycle based on whether a trailer is attached to the vehicle.

12. A processing system for an electric vehicle having a controller configured to implement the method of claim 1.

13. An electric vehicle including an energy store, an electric drive system, and an on-board processing system having the controller of claim 12.

* * * * *